United States Patent Office 2,992,932
Patented July 18, 1961

2,992,932
CERAMIC COMPOSITION
John Alfred Earl, Alhambra, Calif., assignor, by mesne assignments, to Consolidated Electrodynamics Corporation, Pasadena, Calif., a corporation of California
No Drawing. Filed Oct. 11, 1957, Ser. No. 689,469
6 Claims. (Cl. 106—49)

This invention relates to a ceramic composition capable of withstanding high temperature and particularly to a ceramic composition for use as a high temperature electrical insulator. The invention also contemplates methods of making the composition.

There is a great need for electrical instrumentation capable of withstanding severe conditions of service and, in particular, high temperatures. Protection of certain parts of such instruments requires an insulating material capable of withstanding such conditions without detrimental effect upon its thermal and electrical properties. Specifically, a satisfactory insulating material must combine properties of high temperature resistance and high dielectric strength, with an ability to bond itself to a variety of metals. In addition, for uses where flexing of electrical leads occurs, it is necessary that the ceramic material have a high degree of pliancy.

My invention provides a ceramic composition that uniquely combines properties of excellent temperature resistance and excellent electrical insulating characteristics. Although it is useful in a wide number of applications relating to electrical instrumentation, it is particularly suited for use when movement or flexing of electrical leads is likely. This is because its pliancy as a coating is such that repeated flexing and movement of the electrical lead do not crack or crumble an insulating coating of the ceramic.

The ceramic of my invention comprises a mixture of each of the oxides of a first group of metals, namely, lead, titanium, silicon, magnesium and boron mixed with one or more oxides of a second group of metals, namely, nickel, manganese, cobalt and iron. In arriving at this composition, I prefer to separately form a frit and a second mixture, which, for convenience, I refer to as a refractory mixture. The frit contains all of the oxides of the first group except titanium and one or more of the oxides of the second group. The refractory mixture contains all of the oxides of the first group except boron and one or more of the oxides of the second group. The frit is then combined with the refractory mixture and the combination is prepared in a form suitable for use. This preparation is applied and fused to produce the final product.

The method of compounding the ceramic in its preferred form involves the formation of the frit by mixing in dry form compounds of lead, magnesium, boron, and silicon, and at least one compound selected from the group consisting of compounds of nickel, manganese, cobalt and iron, heating this mixture to produce a liquid mass, quenching the liquid mass and grinding the fused product to a fine powder. Thereupon, the frit in powder form is combined with the refractory mixture of compounds of titanium, lead, magnesium and silicon and at least one compound selected from the group consisting of compounds of nickel, manganese, cobalt and iron. This mixture is intimately combined as, for example, by grinding the product in a means such as a ball mill. The resulting well-mixed powder is then ready for use as a coating material.

The term "compounds" as used in the specification and claims is intended to include carbonates, oxalates, and other salts of the metals involved which salts decompose at elevated temperatures to yield oxides. The term compounds is also intended to include the oxides of the metals involved.

A preferred ceramic of my invention is composed of about 38% lead oxide, 21% titanium dioxide, 19% silicon dioxide, 12% magnesium oxide, 3% boron oxide, and 7% of one or more oxides selected from the group consisting of the oxides of nickel, manganese, cobalt and iron. The oxides of manganese, iron, cobalt and nickel act to improve the bond between the ceramic composition and the surface to which it is applied. The respective metals of these oxides are found among the transition elements of period IV of the periodic table and have consecutive atomic numbers ranging from 25 through 29. However, neither chromium, the element next preceding manganese nor copper, the element next following nickel in period IV, are as suitable as manganese, iron, cobalt or nickel for bonding purposes.

It is to be understood, however, that the definition of the ceramic composition in terms of oxides merely provides a convenient basis for indicating the constituents of the mixture. It is not intended to indicate that the chemical or physical association within the final product is necessarily in the form of the oxides.

Without affecting the basic value of the preferred ceramic composition, certain of its properties may be changed by varying the final composition within the following ranges:

| Ingredient: | Percent by weight |
|---|---|
| PbO | 20–45 |
| $TiO_2$ | 20–45 |
| $SiO_2$ | 5–20 |
| MgO | 5–25 |
| $B_2O_3$ | 1–4 |
| Other oxides | 4–11 |

The oxides of beryllium, calcium, strontium, barium, zinc, and cadmium may be substituted for some or all magnesium oxide in equivalent amounts. The metals of these oxides, together with magnesium, all fall within group II of the so-called short form of the periodic table. The remaining two elements of group II, namely mercury and radium, do not have properties suitable for use in the composition. In the case of mercury, the oxides are volatilized at a low temperature too low to permit use in a composition for high temperature use. Magnesium oxide is preferred to the use of the oxides of beryllium, calcium, strontium, barium, zinc or cadmium since a coating having lower porosity and better structural properties is obtained through its use.

Refractory materials, and in particular the metallic oxides which may be classed as refractories, may be substituted for some or all of the titanium dioxide in equivalent amounts. In particular, the thermal properties of the oxides of zirconium, thorium, cerium, and chromium make them suitable for such use.

The effect of such substitutions will vary certain physical characteristics of the final ceramic product for which reason I prefer the use of titanium dioxide and magnesium oxide to produce a ceramic composition having an optimum balance of thermal and electrical properties when the ceramic must act as an electrical insulator at temperatures greater than 1000° F.

The ceramic composition preferably is produced by combining substantially equal quantities of the frit and the refractory mixture. However, the proportions of the frit and the refractory mixture may be varied, provided that the final composition of the ceramic is within the limits set forth above. In terms of metallic oxides, a preferred frit is a mixture comprising by weight about 57% lead oxide, about 30% silicon dioxide, about 6% boron oxide, about 3% magnesium oxide and about 4% in the aggregate of one or more oxides selected from the group consisting of the oxides of nickel, manganese, cobalt and iron. A preferred refractory mixture is a mixture comprising by weight about 42% titanium dioxide, about 20% magnesium oxide, about 20% lead oxide, about 8% silicon dioxide and about 10% in the aggregate of one or more oxides selected from the group consisting of the oxides of nickel, manganese, cobalt and iron. The oxides present in both the frit and the refractory mixture may be quantitatively varied consistent with the permissible variations in composition of the final ceramic product described above.

It is to be noted that the oxides of magnesium, silicon and lead are common to both the frit and the refractory mixture. In the frit, these oxides are present in a eutectic. In particular, I have found that ratios of the weights of magnesium and lead oxides in the refractory mixture to the weights of these oxides in the frit from 6 to 8 for magnesium oxide and from 0.3 to 0.5 for lead oxide are desirable to permit fusing of the ceramic composition at a lower temperature and to promote better bonding to metallic surfaces.

An example of a particularly effective ceramic composition prepared according to the method of my invention is as follows:

*Example*

An initial mixture was compounded from the following ingredients:

| Ingredient: | Percent by weight |
|---|---|
| Red lead | 55 |
| Flint (SiO$_2$) | 28 |
| Boric acid | 10 |
| Magnesium oxide | 3 |
| Alumina | 2 |
| Cobalt oxide (black) | 2 |

These ingredients were combined dry and mixed by grinding. The mixture was then placed in a refractory crucible and heated until a liquid mass was produced. For this particular mixture a temperature in the range from 2000° F. to 2100° F. was found necessary. The time of heating should, of course, be sufficient to permit uniform heating of the entire mass and evolution of all gaseous reaction products and in the example given was about 1 hour. Upon completion of the heating, the liquid mass was quenched in water at room temperature. This quenching produced a granular frit which was then ground in a ball mill to produce a fine powder, in this case, one that passed through a 200 mesh screen.

The frit so formed comprised by weight about 57% lead oxide, 30% silicon dioxide, 6% boron oxide, 3% magnesium oxide, 2% cobalt oxide and 2% aluminum oxide. While the aluminum oxide was not essential, its presence was found desirable to impart additional structural strength to the final product.

The refractory mixture was prepared by mixing in dry form approximately 70% magnesium titanate, 20% lead oxide, 6% nickel oxide and 4% manganese dioxide, the proportions being by weight percent. The magnesium titanate was a commercial material known as "Magnesium Titanate MB" and contained approximately 59% titanium dioxide, 30% magnesium oxide and 11% silicon dioxide. It is to be understood that magnesium titanate merely provides a convenient method for adding the oxides of titanium, magnesium and silicon to the mixture and that these compounds may be added as oxides. In terms of the metallic oxides, the refractory mixture comprised by weight about 42% titanium dioxide, 20% magnesium oxide, 20% lead oxide, 8% silicon dioxide, 6% nickel oxide and 4% manganese dioxide. While lithium is not essential to the efficacy of the mixture, the manganese dioxide may be added to the refractory mixture in the combined form, lithium manganate.

The final product was obtained by grinding in dry form equal quantities of the frit produced as previously described with the refractory mixture. In terms of the metallic oxides this powder had the following approximate composition by weight: 38% lead oxide, 21% titanium dioxide, 19% silicon dioxide, 12% magnesium oxide, 3% boron oxide, 3% nickel oxide, 2% manganese dioxide, 1% cobalt oxide and 1% aluminum oxide.

To form the ceramic composition as a coating bonded to a surface, one method of such application is to mill the powdered dry mixture with a suitable liquid carrier, such as water, to form a slip. This slip can be applied to the surface by brushing, dipping or spraying. The article to be coated is then fired until a fused ceramic coating is bonded to the particular surface. The temperature at which a satisfactory coating is produced, which temperature I call the fusing temperature, varies with the particular composition of the product and the particular surface. I have found that the mixture described in the example above can be fused at a temperature of about 1700° F. This temperature can be maintained for as short a time as one minute to produce a satisfactory coating.

The following electrical and physical properties of the ceramic composition of this invention are indicative of the excellent characteristics of this product:

Thermal coefficient of expansion: $5.6 \times 10^{-6}$ per ° F.
Electrical resistivity:
  400° F., $6 \times 10^{10}$ ohm cms.
  600° F., $2 \times 10^9$ ohm cms.
  800° F., $9 \times 10^7$ ohm cms.
  1000° F., $3 \times 10^6$ ohm cms.
  1200° F., $1.5 \times 10^5$ ohm cms.
Breakdown voltage: 400 volts/mil of coating, 2 kv. leaks through 5 mil coating.

In addition, the operating temperature at which the fused ceramic composition remains unaffected is in excess of 1500° F.

The exceptional characteristic of the ceramic composition of this invention has been demonstrated by applying it as a coating to a wire only 0.012" in diameter. A method by which this ceramic composition may be applied and fused to flexible wire is fully described in copending application, Serial No. 691,179, filed October 21, 1957. The ceramic provided thermal and electrical insulating properties of an exceptional character. At the same time it in no way affected the flexibility of the wire. The wire, with the insulating ceramic upon it, was wound on a 0.025" diameter without rupturing the coating. Repeated flexing of the coated wire resulted in no spalling or cracking of the ceramic coating. The utility of this ceramic in this capacity alone makes it an extremely useful product. Its application to wire leads will permit electrical leads to traverse areas of elevated temperature where prior coatings failed.

The development of this coating provides an opportunity for utilization of electrical instrumentation under conditions which caused frequent failures prior to this time. Numerous other applications of this material are readily apparent in the field of electrical instrumentation. These, whether applied as coatings or as insulating supports, are within the basic concept of the invention.

I claim:

1. A ceramic composition which consists by weight essentially of from 20% to 45% lead oxide, 20% to 45% titanium dioxide, 5% to 20% silicon dioxide, 5% to 25% magnesium oxide, and 1% to 4% boron oxide and from 1% to 11% of at least one oxide selected from the group consisting of the oxides of nickel, manganese, cobalt and iron.

2. A ceramic composition which consists by weight of approximately 38% lead oxide, 21% titanium dioxide, 19% silicon dioxide, 12% magnesium oxide and 3% boron oxide and 7% of at least one oxide selected from the group consisting of the oxides of nickel, manganese, cobalt and iron.

3. A ceramic composition which consists by weight essentially of from 20% to 45% lead oxide, from 20% to 45% of a refractory material selected from a group consisting of the oxides of titanium, zirconium, thorium, cerium, and chromium, from 5% to 20% silicon dioxide, from 5% to 25% of a metallic oxide selected from a second group consisting of the oxides of magnesium, beryllium, calcium, strontium, barium, zinc and cadmium, and from 1% to 4% boron oxide and from 1% to 11% of at least one metallic bonding oxide selected from a third group consisting of the oxides of nickel, manganese, cobalt and iron.

4. A ceramic composition which consists by weight of approximately 38% lead oxide, 21% titanium dioxide, 19% silicon dioxide, 12% magnesium oxide, 3% boron oxide, 3% nickel oxide, 2% manganese dioxide, 1% cobalt oxide and 1% aluminum oxide.

5. A ceramic composition which consists of approximately equal proportions of an enamel frit and a refractory mixture, the enamel frit being made from a mixture of compounds containing at least the elements lead, silicon, boron, magnesium, cobalt, aluminum and oxygen, added together in such combination and quantities to yield upon reaction and decomposition induced by elevated temperature a mixture consisting by weight of about 57% lead oxide, 30% silicon dioxide, 6% boron oxide, 3% magnesium oxide, 2% cobalt oxide and 2% aluminum oxide, and the refractory mixture consisting approximately by weight of 42% titanium dioxide, 20% magnesium oxide, 20% lead oxide, 8% silicon dioxide, 6% nickel oxide and 4% manganese dioxide.

6. A ceramic composition which consists of substantially equal quantities of a frit and a refractory mixture; the frit consisting by weight of about 57% lead oxide, 30% silicon dioxide, 6% boron oxide, 3% magnesium oxide and 4% of at least one oxide selected from the group consisting of the oxides of nickel, manganese, cobalt and iron; and the refractory mixture consisting by weight of about 42% titanium dioxide, 20% magnesium oxide, 20% lead oxide, 8% silicon dioxide and 10% of at least one oxide selected from said group.

References Cited in the file of this patent

UNITED STATES PATENTS

| | | |
|---|---|---|
| 2,220,765 | Hirose et al. | Nov. 5, 1940 |
| 2,225,159 | Deyrup | Dec. 17, 1940 |
| 2,457,158 | Koch | Dec. 28, 1948 |
| 2,508,511 | Goodman | May 23, 1950 |
| 2,590,893 | Sanford | Apr. 1, 1952 |
| 2,790,723 | Stradley et al. | Apr. 30, 1957 |